Sept. 29, 1942.  W. E. TABB ET AL  2,297,174
WIRE TWISTING DEVICE
Filed March 5, 1942
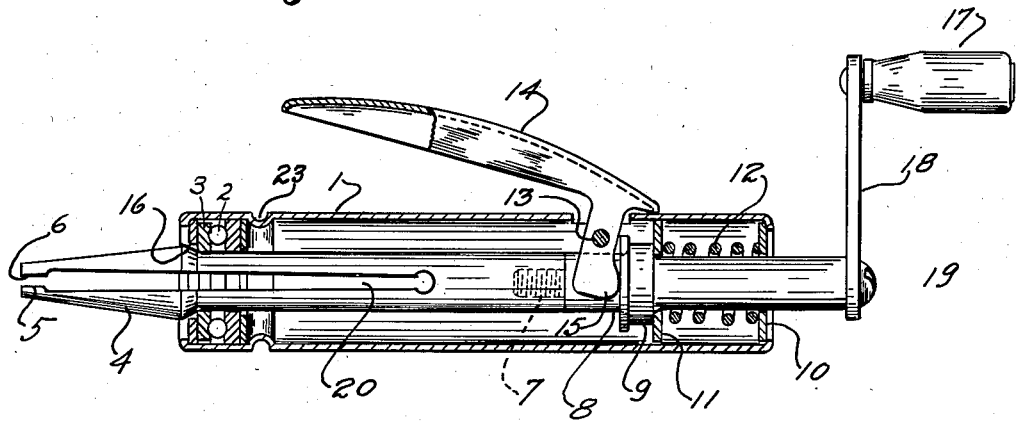
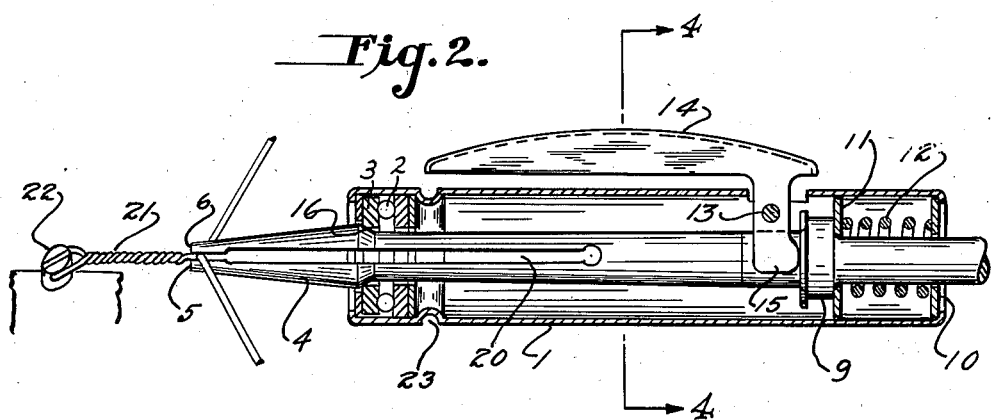
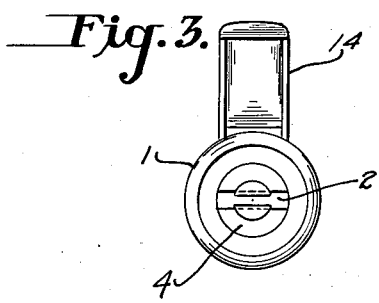
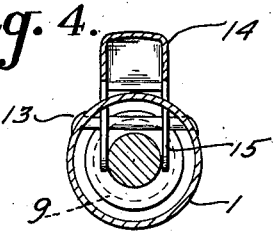
INVENTORS.
WILFRED E. TABB.
WILLIAM PAUL.
BY Frank H. Harmon
ATTORNEY.

Patented Sept. 29, 1942

2,297,174

UNITED STATES PATENT OFFICE 2,297,174

WIRE TWISTING DEVICE

Wilfred E. Tabb, Cleveland Heights, and William Paul, South Euclid, Ohio, assignors to Jack & Heintz, Inc., Cleveland, Ohio Application March 5, 1942, Serial No. 433,470

1 Claim. (Cl. 140—119)

This invention relates to wire twisting devices and has for its primary object to provide a convenient unitary tool so constructed and designed as to enable the operator to grasp the same with one hand, to engage the wire, and then twist the wire by means of a simple turning of a handle with the other hand.

With the foregoing and other objects in view, the invention resides in the combination of parts and details of construction hereinafter set forth in the following specification and appended claim, certain embodiments thereof being illustrated in the accompanying drawing in which:

Figure 1 is a view in longitudinal section taken through the wire twisting device, showing the same in normal inoperative position;

Figure 2 is a similar view showing the same in operation and the jaws gripping a wire;

Figure 3 is a view in front elevation; and

Figure 4 is a view in section taken along line 4—4 of Figure 2 showing the operating handle and its relationship to the rest of the assembly.

Referring more particularly to the drawing, the device comprises a cylindrical barrel 1 provided with ball bearings 2 and race 3 to receive a rotatable wire engaging member 4 of spring metal having an elongated slot at 20 and provided with jaws 5 and 6. The wire gripper 4 is screw threaded at 7 to a rotatable shaft 8 which latter is provided with a shoulder 9 and which is provided with a stationary bearing washer 10 and a slidable washer 11.

As shown in the drawing the wire clamping jaws 5 and 6 are normally maintained apart in inoperative position by the action of a compression spring 12 bearing against stationary bearing washer 10, slidable bearing washer 11 and the shoulder 9. Mounted on a cross pivot 13 within the cylinder 1 is a hand lever 14 which normally assumes the inoperative position shown in Figure 1 of the drawing. A grasping of lever 14 by hand causes a bell crank action of the same about its pivot 13 in a counterclockwise direction to the position shown in Figure 2 which effects an engagement of arms 15 against the shoulder 9 against the action of compression spring 12 and a consequent movement of the wire gripper 4 from left to right. As this occurs the enlarged conical head 16 of the wire gripper 4 rides on the race 3 in a manner to compress the head and bring the two wire gripping jaws 5 and 6 together. This simple action being accomplished by the use of one hand leaves the other hand free to rotate the handle 17 and arm 18, secured to rod 8 by a screw 19. A rotation of handle 17 while the wire gripping jaws 5 and 6 are engaging a wire 21, that is wrapped around and held by a screw 22, brings about a twisting of the wire in accordance with the extent to which the handle is rotated. It is to be understood that the race 3 may be held in position by any convenient expedient such as forming an internal bead 23 in the casing 1.

From the foregoing it will be seen that there has been provided a simple and convenient wire twisting device that enables the gripping of the wire by a one hand operation of lever 14 and the twisting of the wire by a cranking of handle 17 and arm 18 with the other hand. Likewise a release of hand pressure on the hand lever 14 allows spring 12 to force the member 4 to the left and consequently disengage and open the wire gripping jaws 5 and 6. The arrangement particularly provides for quick, efficient and positive action in connection with the twisting and wrapping of safety wires for locking of nuts, screws, bolts and the like in machines of various kinds.

We claim:

In a wire twisting device, a body portion and a split spring metallic rod with wire gripping jaws slidably and rotatably mounted in said body portion with said jaws protruding outwardly therefrom and resilient means for normally maintaining same in said position with said jaws spaced apart, said jaws having an enlarged head and a bevel surface, a restricted size bearing assembly carried by said body portion for engaging said bevel surface, a pivoted hand lever carried by said body portion and engaging said rod and maintained normally in extended position under the influence of said resilient means, said lever being graspable with the body portion by one hand so as to slidably retract said jaws and to force the same in closed engagement with the wire to be engaged as said bevelled head rides on the confining surface of said restricted bearing assembly, said rod carrying at its other end a handle engageable by the other hand to rotate the rod and its closed wire engaging jaws to effect a twisting of the wire, as said head engages said bearing assembly in bearing relationship, said resilient means, upon release of manual clamping pressure on said operating lever, being adapted to effect the return of said head to normal outer position and said clamping jaws to open spaced relationship.

WILFRED E. TABB.
WILLIAM PAUL.